United States Patent [19]
Potter et al.

[11] Patent Number: 4,489,263
[45] Date of Patent: Dec. 18, 1984

[54] ELECTRONIC SPEED CONTROL CIRCUITS

[75] Inventors: Mark A. Potter; John S. Crawford, both of Adelaide, Australia

[73] Assignee: Technical Components Pty. Ltd., Hendon, Australia

[21] Appl. No.: 542,856

[22] Filed: Oct. 17, 1983

[30] Foreign Application Priority Data

Oct. 20, 1982 [AU] Australia ............................... PF6435

[51] Int. Cl.³ ............................................. H02P 5/34
[52] U.S. Cl. ..................................... 318/727; 318/767; 318/772
[58] Field of Search ................. 318/727, 345 CB, 767, 318/772, 809, 729; 361/74, 81

[56] References Cited

U.S. PATENT DOCUMENTS

3,757,184  9/1973  Chute ........................... 318/345 CB
4,323,835  4/1982  Lee ..................................... 318/809

Primary Examiner—E. A. Goldberg
Assistant Examiner—A. Evans
Attorney, Agent, or Firm—Townsend and Townsend

[57] ABSTRACT

Circuit arrangements to improve the performance of motor speed control circuits using electronic switching on an AC waveform where it is desired to remotely control the electronic switch without either load current or the load waveforms being present at the controlling element. The voltage across the switching device, during the time it is off, is rectified, and used as the charging voltage for the phase firing circuit, with a resistor capacitor timing network determining the firing of the switching device when the capacitor voltage reaches a predetermined value.

5 Claims, 13 Drawing Figures

FIG.1

| RESISTOR | $R_1$ = | 0 to 500 K OHMS |
| CAPACITOR | $C_1$ = | 0.1 MICROFARADS |
| DIAC | $T_1$ = | BR 100/03 |
| TRIAC | $T_2$ = | BT 139 |

FIG.2

FIG. 3a
SUPPLY VOLTAGE

FIG. 3b
VOLTAGE ACROSS TRIAC T2

FIG. 3c
VOLTAGE ACROSS LOAD

ELECTRONIC SPEED CONTROL CIRCUITS

The present invention relates to circuit arrangements to improve the performance of motor speed control circuits using electronic switching on an AC waveform where it is desired to remotely control the electronic switch without either load current or the load waveforms being present at the controlling element.

THE PRIOR ART

A number of circuit arrangements are well known where control of an electronic switching device can vary the average power dissipated in a load by altering the time or phase at which the switching device is switched on during the positive and negative half cycles (and automatically switching off at the end of each half cycle).

In particular such a synchronously switched waveform is used to control an induction motor which is driving a fan load. The characteristics of an induction motor decreases with the applied voltage as the control device is switched on later in each half cycle. That is as the average voltage applied to the motor decreases. Without load an induction motor will run at near synchronous speed. But with a load applied the rotor slip will increase as the load is increased. The nature of a fan load is such that the loading is extremely dependant on the fan speed and on its ability to move air. Thus as the phase angle at which the electronic control device is switched is retarded (switched on later in each half cycle) then the output power (torque) of the motor decreases. The fan load on the motor must also fall to balance the motor torque. This balance is achieved by the fan speed decreasing until the fan load is equal to the available motor power.

In such systems the motor is designed to give minimal variation in torque over the speed range of the motor.

Figure 1:
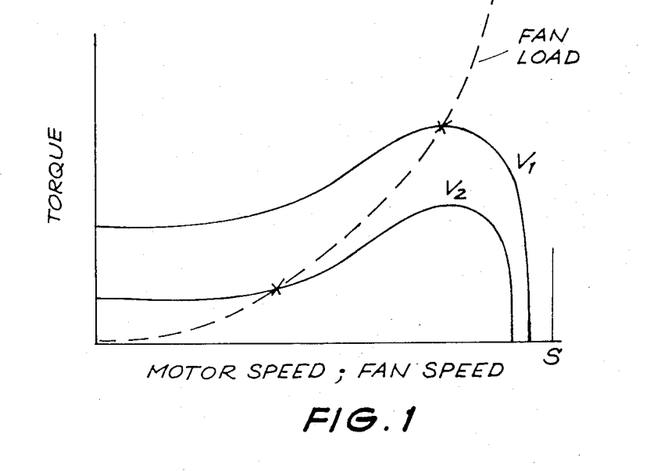
FIG. 1 is a plot of motor torque-speed characteristics and of fan load torque vs. speed of a typical fan motor.

FIG. 1 shows the nature of the typical characteristics of a motor with the torque - speed characteristic marked V1 typical of the motor at a given applied voltage V1. V2 is a curve showing a lower torque at a lower applied voltage. This is where the switching device is switched on at a later time in each half cycle.

Also shown is a typical fan load torque against speed line. From this it can be seen that the fan speed at which this line intersects the curve marked V1 is significantly greater than the speed at which intersects the curve V2. Thus by varying the average voltage applied to the motor fan combination a variation in fan speed can be obtained.

Figure 2:
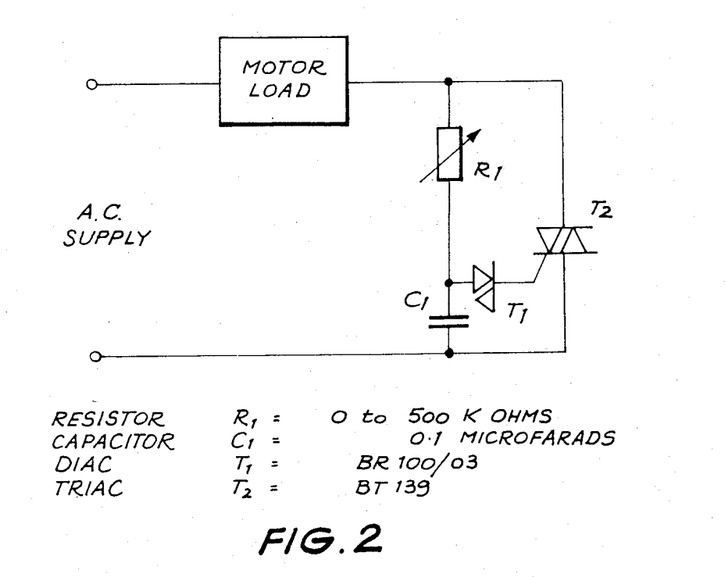
FIG. 2 is a typical prior art circuit for varying fan motor voltage.

Such techniques are well known, and one circuit commonly used is shown in FIG. 2 in a basic simplified form.

Figure 3A:
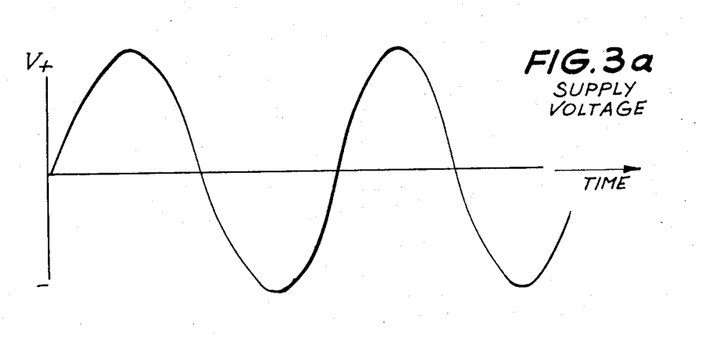
FIGS. 3a, 3b and 3c are waveforms of the voltage at certain points in the circuit of FIG. 2.
Figure 3B:
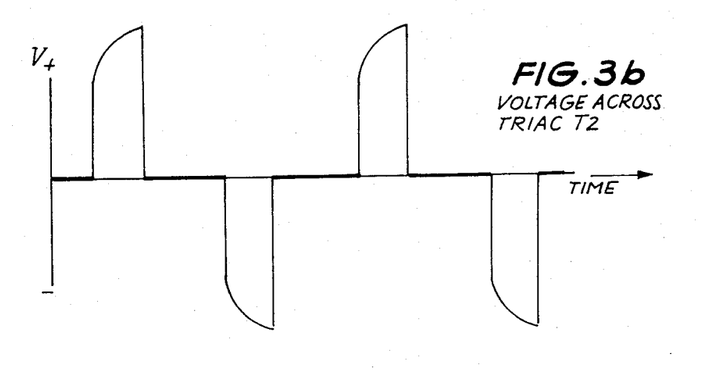
Figure 3C:
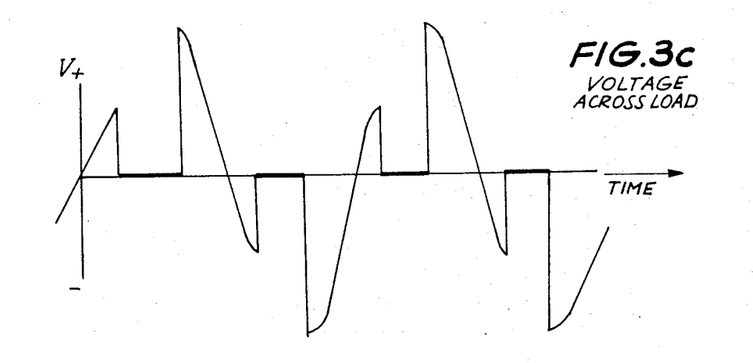

Waveforms are shown in FIG. 3.

When an AC signal is applied the electronic switching device, which in this case is a TRIAC T2 is initially switched OFF. Thus no significant current is flowing in the load, no voltage is dropped across the load and all the supply voltage is apparent across the triac T2.

As voltage is present across T2 capacitor C1 can charge via resistor R1. The rate at which capacitor C1 is charged is set by variable resistor R1. T1 is a bi-directional trigger device or DIAC. This has the property that when a voltage of more than approximately 33 volts of either polarity is applied across T1 it will switch ON partially discharging C1 into the gate electrode of the triac T2. This discharge into the gate of T2 causes T2 to switch into its ON state and the voltage across T2 falls to typically about 2 volts. Thus from this time until T2 switches off the supply voltage (apart from this 2 volts) must all be applied to the motor load.

T2 does not switch off until the current flowing through T2 falls to near zero below the triac holding current. This occurs at the end of the half cycle because of the sinusoidal nature of the supply waveform.

When the triac T2 switches off C1 is then free to charge via R1 in the opposite direction until the voltage across C1 reaches the trigger threshold of T1 and T2 is fired (or switched ON) for the following half cycle.

The voltage waveforms associated with the load and the triac are shown in FIG. 3. Because the motor load is somewhat inductive the current in the circuit will lag the voltage a little and the triac T2 will not switch off until the supply voltage has already passed through zero. That is T2 switches off when the lagging current passes through zero. It is obvious that the supply waveform FIG. 3a must equal the sum of the waveform across the load (FIG. 3c) and the triac FIG. 3b. Such circuits and waveforms are common in the literature.

In this circuit of FIG. 2 a number of practical considerations arise. In particular the fast transient nature of the switched waveform is evident across the triac T2. Such a waveform generates significant radio interference which generally requires an iron cored choke to achieve effective interference suppression. Such a choke commonly makes sufficient audible magnetrictive noise to create a nuisance especially if it is mounted remote from the motor it is to control. Similarly the voltage across the potentiometer R1 is a waveform combining the switched waveforms of T1 as well as T2: so that the control potentiometer R1 is invariably mounted as part of the electronic speed control assembly. It is therefore usual to mount the speed control remotely from the motor load and to accept the problems of physical size of the controller, it's inclination to generate audible noise particularly on lower speeds where the triac is fired around the middle of the half cycle and voltage transients are greatest.

Such controls are common and in general the phase delay generated by the time constant R1×C1 translates into an acceptable compromise for the speed control achieved with the fan against the value of R1 for a linear control potentiometer R1.

Another approach is to use an integrated circuit controller which similarly uses Triac as the control element but which has an electronic timing circuit with an electronic trigger delay which has a fixed starting reference point with reference to the zero crossing points of the mains supply. The time delay from this reference is proportional to the value of the speed setting potentiometer.

Figure 4:
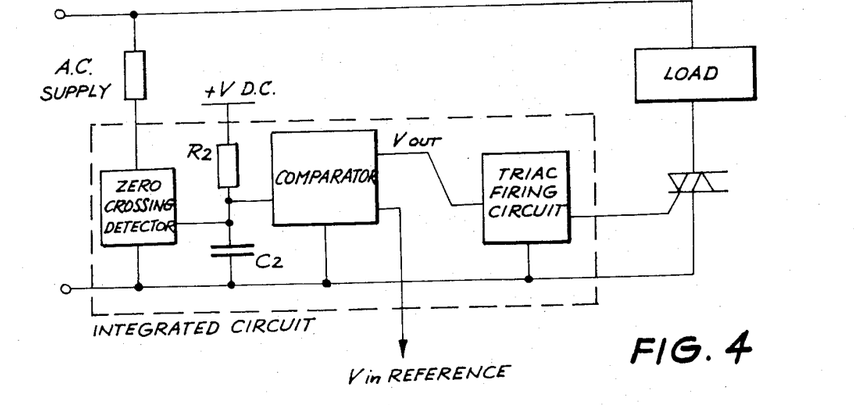
FIG. 4 is another prior art circuit utilizing an integrated circuit controller.

Such a circuit is shown in block diagram form in FIG. 4. A typical circuit might use the integrated circuit Philips type TCA280A in circuits published by the manufacturer in a number of references.

In this circuit the zero crossing detector discharges the phase timing capacitor C2 each time the mains supply voltage passes through zero. Thus from this fixed reference point at each half cycle C2 starts to charge towards a DC power supply voltage VDC via the timing resistor R2. When this voltage on Cs is equal to the input voltage reference V in ref. the comparator output VO signals to the triac firing circuit to fire the triac.

Thus the phase firing angle can be advanced or retarded by altering the DC voltage of V in ref.

By controlling the fan speed by means of a DC voltage such a control voltage can be driven from a simple circuit and is easily carried with acceptable accuracy over large distances. Simple circuit arrangements can permit this voltage to be set by a simple remote potentiometer. The speed control can become part of the fan and motor assembly and in many areas the application of a speed controlled motor is greatly simplified.

OBJECT OF THE INVENTION

This invention relates to problems which have been found in different applications where the extent to which a fan is loaded by the air flow it generates may vary over wide margins in practical applications. In particular if the fan is underloaded the speed control characteristic becomes substantially non-linear against either control voltage or control potentiometer setting.

It is possible to deliberately create a non-linear control potentiometer characteristic to satisfy a fan load in specific installations but in operating a considerable amount of effort attempting to devise a more generally appliable approach we found the fan and its control tends to become unstable and still remains non-linear if the fan is lightly loaded.

Typical measurements would indicate that if the input control voltage range was from 0 to +% VOLTS DC some 90% of speed control would be achieved between 4 and 5 volts. And even if the speed control range was limited to only cover this part of its range between 4 and 5 volts there was still substantial non-linearity.

SUMMARY OF THE INVENTION

The objective of this invention is to provide a circuit arrangement whereby a linear response might be obtained from such an integrated circuit by using a further input signal to the timing function in addition to the zero crossing phase reference signal and the input control signal. The result of adding this circuit arrangement has been a remarkable improvement in control linearity over the entire control range. This improvement in linearity is evident from full motor load until the fan load on the motor becomes so small that once running near full synchronous speed the load is insufficient to slow the fan even when the control is returned to the minimum speed setting.

PREFERRED EMBODIMENTS OF THE INVENTION

Figure 5:
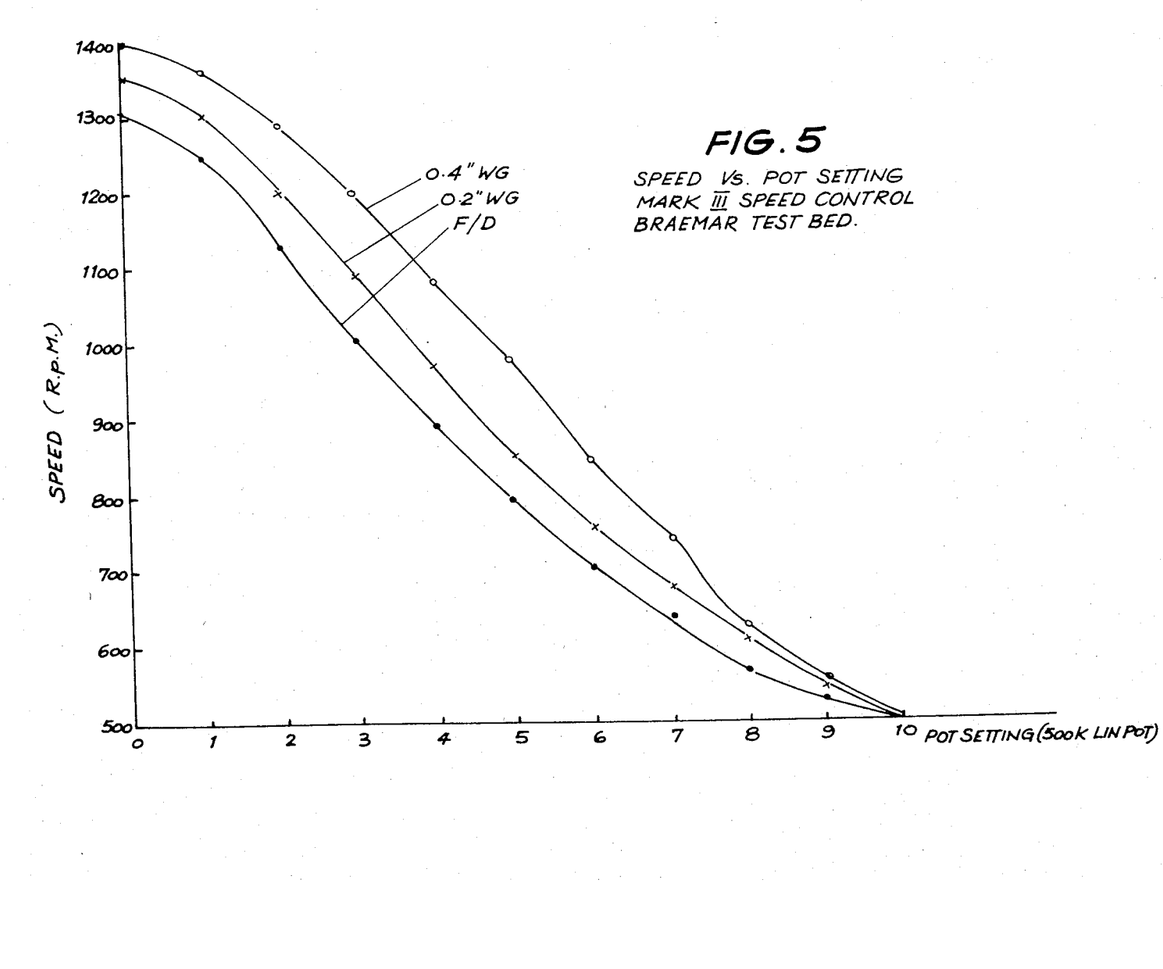
FIG. 5 is a plot of speed vs. pot setting of a typical dia-triac circuit.

FIG. 5 shows the speed versus setting curve of a typical dia-triac circuit for 3 different fan loads. For smaller loads it becomes unstable.

Figure 6:
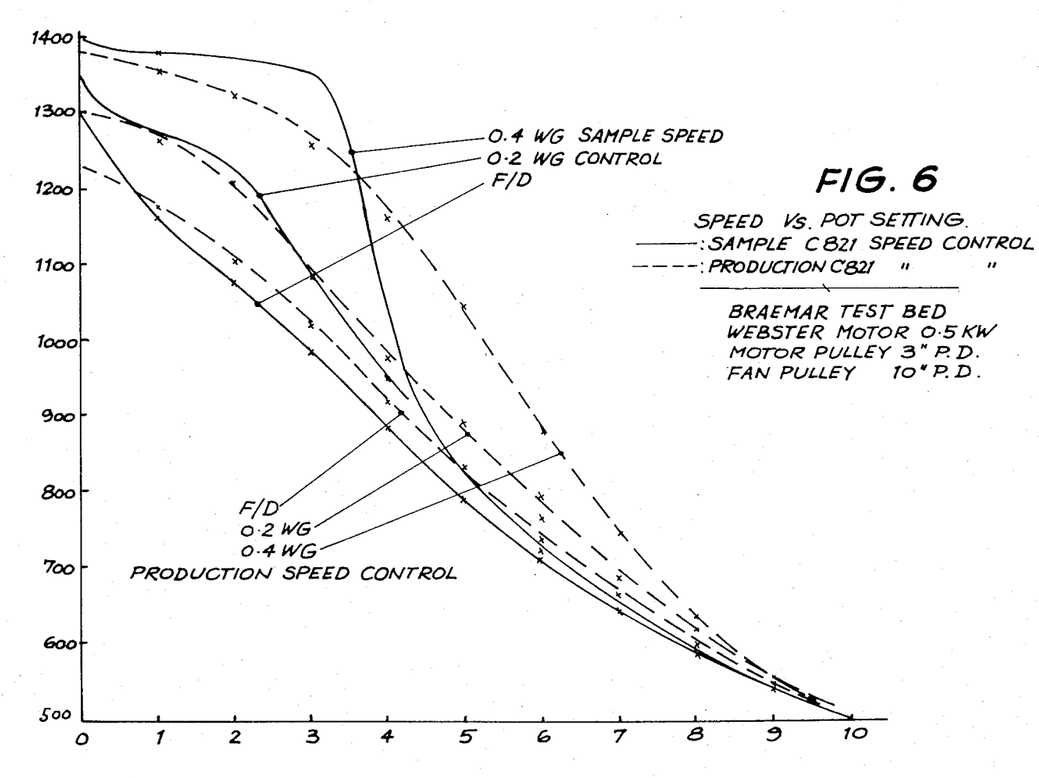
FIG. 6 is a similar plot, of the circuit of FIG. 7, utilizing a TCA 280A integrated circuit.
Figure 7:
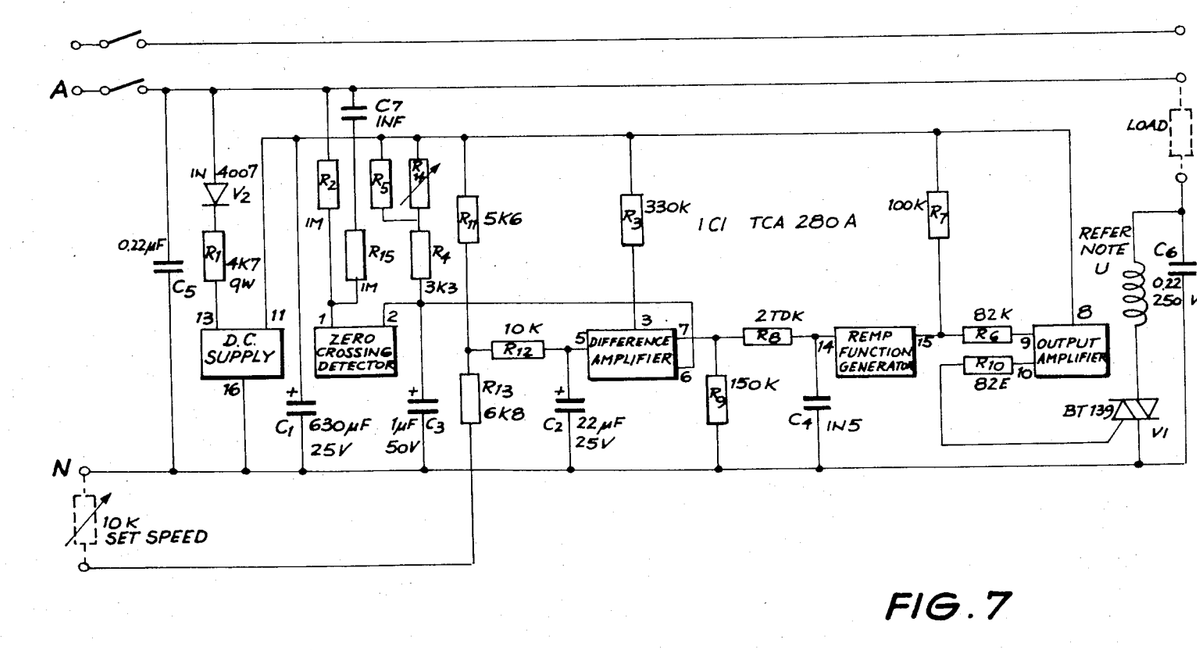
FIG. 7 is the circuit, the plot of which is shown in FIG. 6.

FIG. 6 shows the graphs of speed versus setting of the integrated circuit controller based on the TCA280A integrated circuit. The circuit of this speed control is shown in FIG. 7.

Numerous circuit amendments have been tried to coax this circuit to give results at least equal to those shown in FIG. 5; all without giving an approach which could be considered successful. Attempts to monitor the fan loading on the motor by means of the extent to which he motor presented an inductive load failed as it was found the current and voltage phase relationship showed insufficient charge to gain a control function.

Finally careful observation of oscilloscope waveforms across the triac indicated a small voltage variation which varied with the extent of the fan loading. It is the circuit arrangement covered by this invention which utilizes this observed voltage to achieve the required control characteristic. It was unexpected that during the off time of the triac when no current was able to flow that other than the full mains voltage should be observed across the triac. There must be, during this time, an emf across the motor winding although with zero current and a motor running well below full speed this was not expected. The motor used was a PSC or permanent—split—capacitor motor with a permanently connected start winding in series with a capacitor to provide the required starting torque. Possibly an emf could be induced in the main winding from this winding although it is hard to understand how such an emf would be load dependant.

Therefore in one broad form the invention comprises a circuit arrangement wherein the speed of an induction motor is controlled by varying the phase angle at which the alternating supply waveform is switched using an electronic switching device and where the voltage across the switching device during the time it is off is rectified and used as the charging voltage for the phase firing circuit; the phase at which the switching device is fired being determined by a resistor - capacitor timing network in which the capacitor is discharged at a fixed time relative to each half cycle and the firing point is set such that the switching device is switched on whenever the capacitor voltage reaches a certain value.

In one embodiment of the present invention the voltage across the switching device is rectified and the resulting DC voltage is used as the timing aiming voltage in the resistance capacitance timing circuit.

Further it is possible for the resistive path of the resistive capacitance timing network to contain a non-linear resistance element. This non-linear resistance element can be a zener diode in series and or in parallel with part of the timing resistor.

Figure 8:
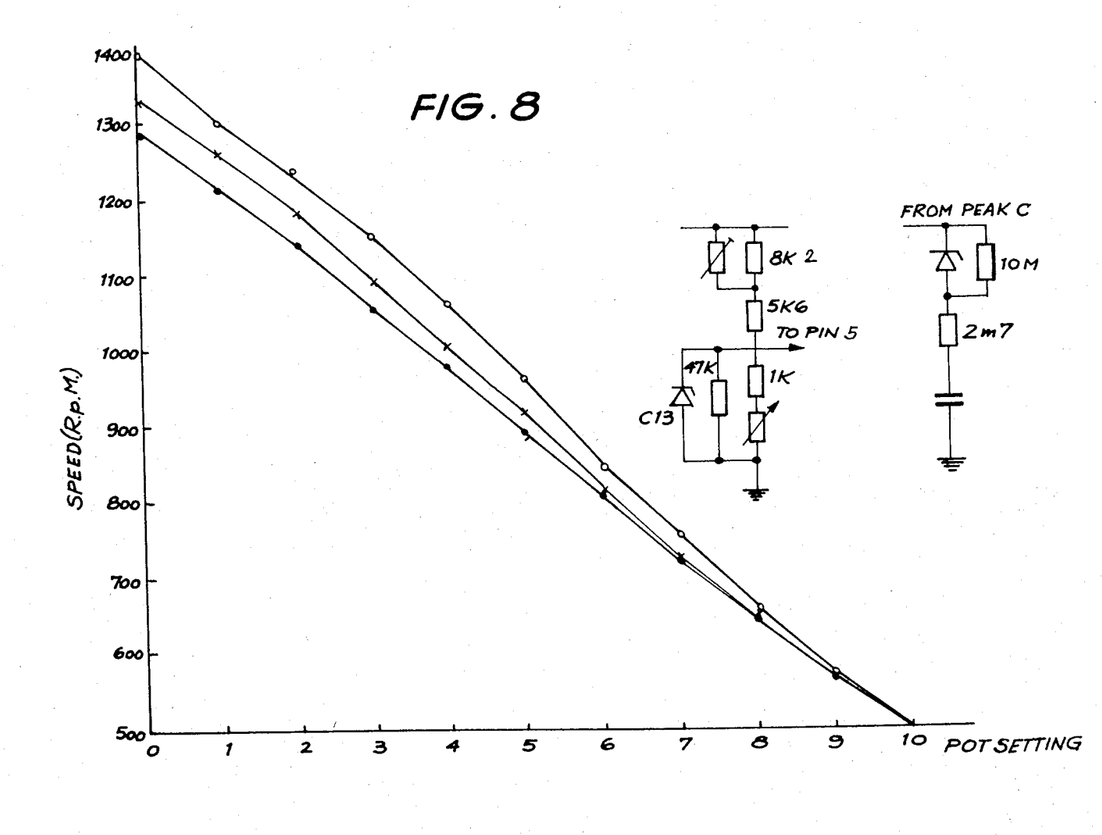
FIG. 8 is a plot of speed vs. potentiometer setting for three loads utilizing the circuit of FIG. 9.

FIG. 8 shows the graphs obtained for speed against potentiometer setting for the same 3 loads as well as the curve for an even lighter load. A preferred embodiment of a circuit according to the invention is that shown in FIG. 9. This circuit utilizes the voltage present across the triac during the off time of the triac to provide a reference voltage to set the rate of charge of the timing capacitor. The final result is a great improvement on the performance of both the previous speed control circuits and it is felt a circuit improvement which will provide advantages in its application particularly in the field of evaporative air conditioning where the nature of the duct loading can vary to a very large extent between different installations.

Figure 9:
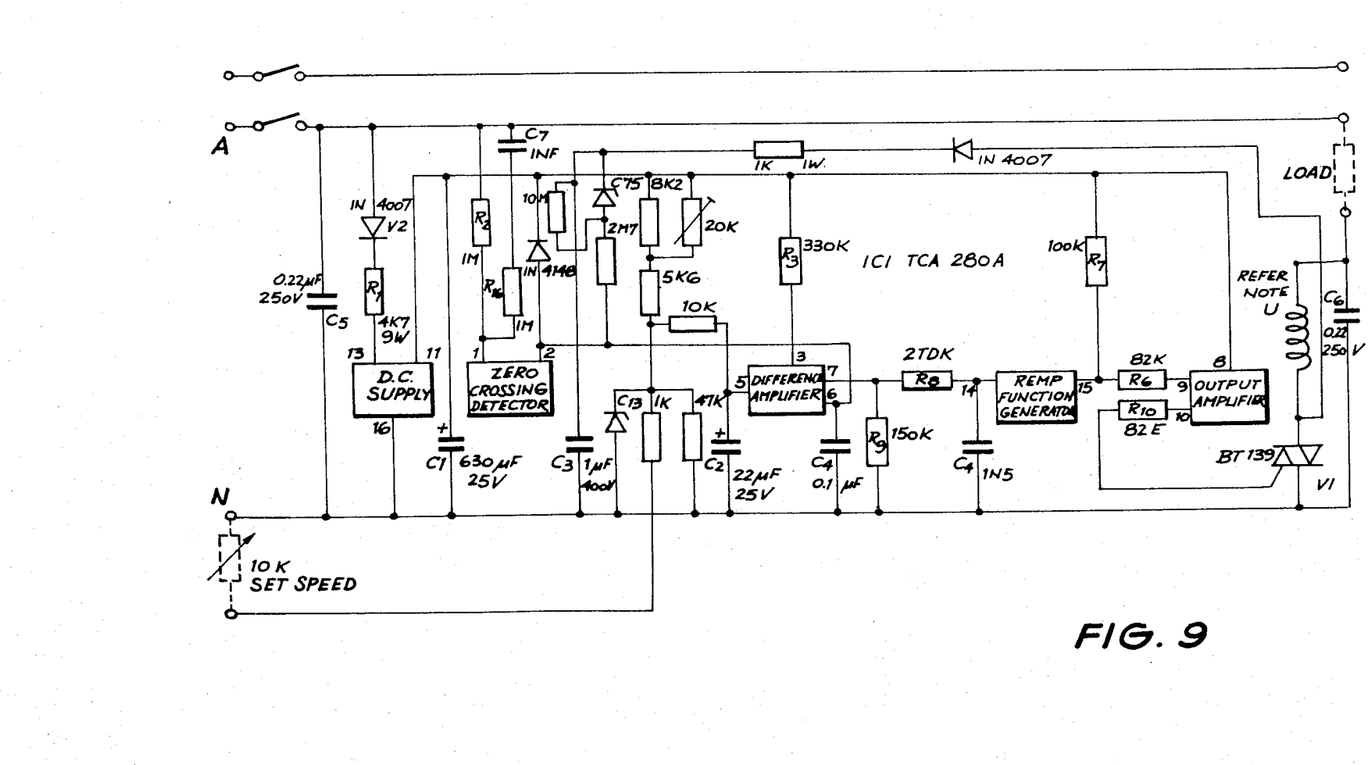
FIG. 9 is a circuit utilizing a preferred embodiment of the present invention.

In the circuit of FIG. 9 the boxes contain those parts of the circuit which are contained in the integrated circuit. The numbers of the box connections correspond to the pin numbers of the 16 pin dual in line package of the integrated circuit type TCA280A.

Figure 10:
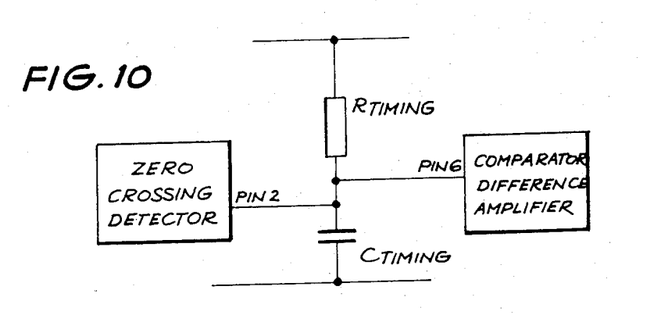
FIG. 10 is a part of the original circuit showing the changes of the invention.
Figure 11:
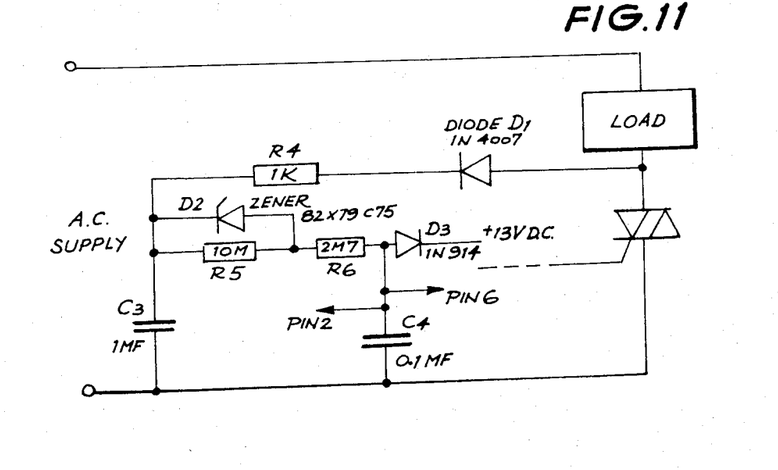
FIG. 11 is a new version of the partial circuit of FIG. 10 showing an embodiment of the present invention.

The circuit changes of this invention are shown in the part of the original circuit in FIG. 10, and its new version according to an embodiment of the present invention in FIG. 11.

In this circuit in FIG. 10 the timing capacitor is discharged each time the mains voltage passes through zero and charges at a rate set by the timing resistor to the voltage threshold set by the reference voltage to which the comparator is set.

In the new circuit FIG. 11 the voltage across the triac is rectified by the diode D1 with the peak voltage being held by capacitor C3. Resistor R4 limits the inrush current to C3 to a safe value to prevent a switch on current surge exceeding the current carrying capability of D1 or C3.

D2 and R5 make up a non-linear resistive element by which the normal current flow out of C3 is limited by R5 until the voltage of 75 volts is reached across R5 when D2 begins to conduct. In series with this non-linear element R6 makes the timing resistance for this circuit. C4 is the timing capacitor and is charged by the current flowing through D2, R5 and R6.

The aiming voltage of this timing circuit is now the voltage held on C3 and may be as high as the peak supply voltage of about 340 volts. Thus this circuit has a much higher aiming voltage than in the previous circuit. D3 is included as a catching diode to prevent the voltage on C4 from exceeding the 13 V supply of the integrated circuit.

The inclusion of the non-linear resistive element which may be the zener diode and resistor as shown or a suitable voltage dependant resistor has been found to improve the linearity of the response of this circuit.

A circuit of this nature thus improves the response of the normal integrated circuit driven speed control. Minor circuit variations are evident by which the motor speed can be controlled as the load is varied which compensates for the charging load and which use the same signal from across the triac to achieve this control. For example it is possible to include with the voltage and current derived from the voltage across the triac a small charging current into C4 derived, as in the earlier circuit, from the 13 volt DC supply rail.

We claim:

1. A circuit arrangement wherein the speed of an induction motor is controlled by varying the phase angle at which the alternating supply waveform is switched using an electronic switching device and where the voltage across the switching device during the time it is off is rectified and used as the charging voltage for the phase firing circuit; the phase at which the switching device is fired being determined by the rectified voltage and a resistor - capacitor timing network in which the capacitor is discharged at a fixed time relative to each half cycle and the firing point is set such that the switching device is switched on whenever the capacitor voltage reaches a certain value.

2. A circuit arrangement as claimed in claim 1 wherein the voltage across the switching device is rectified and the resulting DC voltage is used as the timing aiming voltage in resistance capacitance timing circuit.

3. A circuit arrangement as claimed in claim 2 where the resistive path of the resistive capacitance timing network contains a non-liner resistance element.

4. A circuit arrangement as claimed in claim 3 where the non-linear resistance element is made up by the addition of a zener diode in series and or in parallel with part of the timing resistor.

5. A circuit arrangement as claimed in claim 4 above where the switching device is a triac.

* * * * *